(12) United States Patent
Badino et al.

(10) Patent No.: US 8,548,229 B2
(45) Date of Patent: Oct. 1, 2013

(54) METHOD FOR DETECTING OBJECTS

(75) Inventors: Hernan Badino, Pittsburgh, PA (US);
Uwe Franke, Uhingen, DE (US)

(73) Assignee: Daimler AG, Stuttgart (DE)

( * ) Notice: Subject to any disclaimer, the term of this patent is extended or adjusted under 35 U.S.C. 154(b) by 209 days.

(21) Appl. No.: 13/201,241

(22) PCT Filed: Feb. 4, 2010

(86) PCT No.: PCT/EP2010/000671
§ 371 (c)(1),
(2), (4) Date: Aug. 12, 2011

(87) PCT Pub. No.: WO2010/091818
PCT Pub. Date: Aug. 19, 2010

(65) Prior Publication Data
US 2011/0311108 A1    Dec. 22, 2011

(30) Foreign Application Priority Data
Feb. 16, 2009   (DE) .......................... 10 2009 009 047

(51) Int. Cl.
*G06K 9/00*   (2006.01)

(52) U.S. Cl.
USPC .......................................... 382/154; 382/106

(58) Field of Classification Search
USPC ................. 382/103, 104, 106, 154; 345/419, 345/420
See application file for complete search history.

(56) References Cited

U.S. PATENT DOCUMENTS
6,791,540 B1 * 9/2004 Baumberg .................... 345/419
8,385,599 B2 * 2/2013 Camus et al. ................ 382/104
2007/0274566 A1   11/2007 Fujimoto
2009/0297036 A1   12/2009 Badino et al.

FOREIGN PATENT DOCUMENTS
DE   102005008131 A1   8/2006

OTHER PUBLICATIONS

Vedula et al. "Three-Dimensional Scene Flow", appeared in the 7th International Conference on Computer Vision, Corfu, Greece, Sep. 1999 pp. 722-729.
Hirschmueller "Accurate and Efficient Stereo Processing by Semi-Global Matching and Mutual Information" CVPR 2005, San Diego, CA, vol. 2 (Jun. 2005), pp. 807-814.
Solan L: "The And/or Rule" Jan. 1, 1993, The Language of Judges, University of Chicago Press, US, pp. 45-54 XP008121481, ISBN: 978-0-226-76791-8 the whole document.

(Continued)

*Primary Examiner* — Daniel Mariam
(74) *Attorney, Agent, or Firm* — Patent Central LLC; Stephan A. Pendorf

(57) ABSTRACT

A method for detecting objects, wherein two images of a surrounding (1) are taken and a disparity image is determined by means of stereo image processing, wherein a depth map of the surrounding (1) is determined from the determined disparities, wherein a free space delimiting line (2) is identified, delimiting an unobstructed region of the surrounding (1), wherein outside and along the free space delimiting line (1) the depth card is segmented by segments (3) of a suitable width formed by pixels of the same or similar distance to an image plane, wherein a height of each segment (3) is estimated as part of an object (4.1 to 4.6) located outside of the unobstructed region in a way, such that each segment (3) is characterized by the two-dimensional position of the base (for example the distance and angle to the longitudinal axis of the vehicle) and the height thereof.

13 Claims, 1 Drawing Sheet

(56) References Cited

OTHER PUBLICATIONS

Schanz A et al: "Autonomous parking in subterranean garages—a look at the position estimation" Intelligent Vehicles Symposium, 2003. Proceedings. IEEE Jun. 9-11, 2003, Piscataway, NJ, USA, IEEE, Jun. 9, 2003, pp. 253-258 XP010645884, ISBN: 978-0-7803-7848-3, p. 253, col. 2; figure 1.

L. Vlacic: "Intelligent Vehicle Technologies" Jan. 1, 2001, Intelligent Vehicle Technologies: Theory and Applications, Butterworth-Heinemann, Oxford, pp. 131-188, XP008103738, ISBN: 978-0-7506-5093-9 pp. 131-188, p. 148, paragraph 1-p. 152, paragraph 4

Hernan Badino et al: "The Stixel World—A Compact Medium Level Representation of the 3D-World" Sep. 9, 2009, Pattern Recognition : 31st DAGM Symposium, Jena, Germany, Sep. 9-11, 2009; Proceedings; [Lecture Notes in Computer Science; 5748], Springer Berlin Heidelberg, Berlin, Heidelberg, Germany, pp. 51-60, XP019127048, ISBN: 978-3-642-03797-9, the whole document.

David Pfeiffer et al: "Efficient representation of traffic scenes by means of dynamic stixels" Intelligent Vehicles Symposium (IV), 2010 IEEE, IEEE, Piscataway, NJ, USA, Jun. 21, 2010, pp. 217-224 XP031732275, ISBN: 978-1-4244-7866-8, the whole document.

Wedel A et al: "B-Spline Modeling of Road Surfaces With an Application to Free-Space Estimation" IEEE Transactions on Intelligent Transportation Systems, IEEE, Piscataway, NJ, USA, vol. 10, No. 4, Dec. 1, 2009, pp. 572-583 XP011282306, ISSN: 1524-9050, DOI: DOI:10.1109/TITS.2009.2027223, the whole document.

Susumu Kubota et al: "A Global Optimization Algorithm for Real-Time On-Board Stereo Obstacle Detection Systems", Intelligent Vehicles Symposium, 2007 IEEE, IEEE, PI, Jun. 1, 2007, pp. 7-12, XP031126913, ISBN: 978-1-4244-1067-5, the whole document.

Miura J et al: "Modeling obstacles and free spaces for a mobile robot using stereo vision with uncertainty" Robotics and Automation, 1994. Proceedings., 1994 IEEE International Conference on San Diego, CA, USA May 8-13, 1994, Los Alamitos, CA, USA, IEEE Comput. Soc, May 8, 1994, pp. 3368-3373, XP020097533, DOI: DOI:10.1109/ROBOT.1994.351052 ISBN: 978-0-8186-5330-8, the whole document.

* cited by examiner

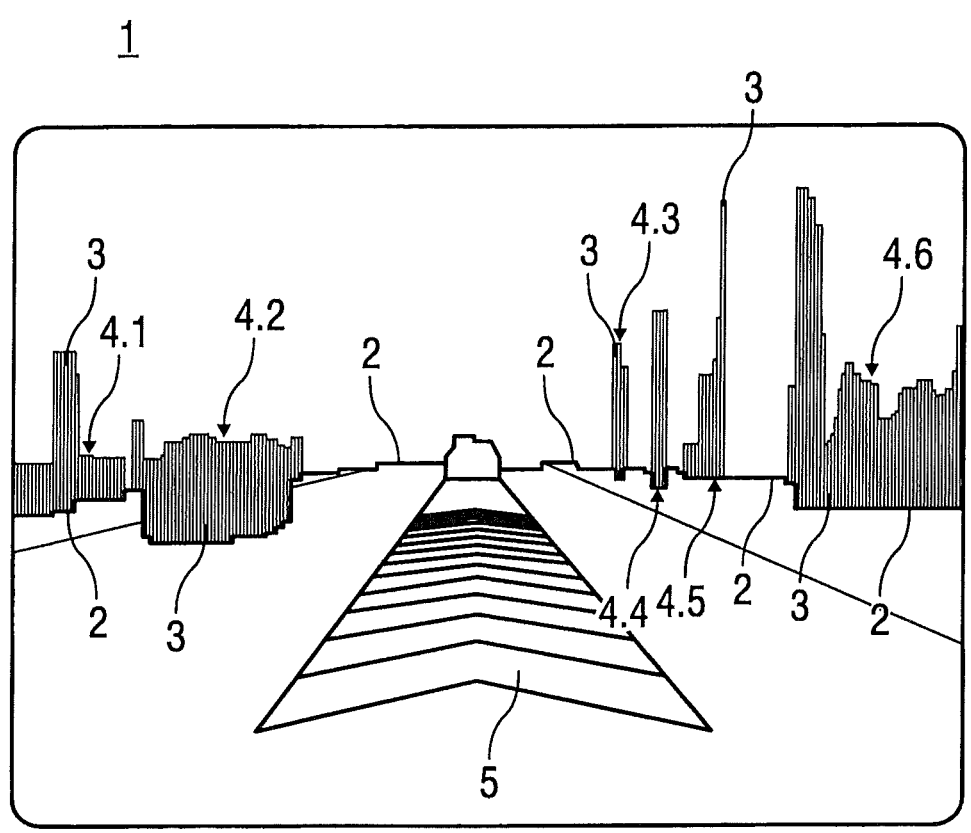

METHOD FOR DETECTING OBJECTS

BACKGROUND OF THE INVENTION

1. Field of the invention

The invention relates to a method for detecting objects.

2. Description of the related art

Modern stereo methods, as well as distance measuring sensors such as PMD, Lidar or high-resolution radar, generate a three-dimensional image of the surroundings. From these data, the relevant objects, for example stationary or moving obstacles, can be extracted. In practical applications, the step from the raw data to the objects is very large and often leads to many heuristic special solutions. For this further processing, a compact abstraction involving a small data volume is therefore desirable.

Known methods of stereo image processing operate with non-dense stereo cards and directly extract objects using heuristics which are deemed suitable. In general, there is no abstraction level which supports this step.

From US 2007/0274566 A1, a method for the detection of pedestrians is known, in which an image of a scene in front of a vehicle is recorded. In this image, a speed and a direction of pixels representing characteristic points are then calculated. Coordinates of the pixels which are obtained in this process are converted into a plan view. In this process, it is determined whether the characteristic points represent a two-dimensional or a three-dimensional object. If the object is three-dimensional, it is determined whether the object is moving. On the basis of the change of the speed with which the object moves, it is determined whether the object is a pedestrian. In extracting the characteristic points, edges of the object are detected and eroded, thus determining the middle of the edge. The eroded edge is then once again extended, so that the edge has a predetermined width, for example three pixels, so that all of the edges of the object have an equal width.

BRIEF SUMMARY OF THE INVENTION

Advantageous further developments form the subject matter of the dependent claims.

In a method according the invention for detecting objects, a distance image over horizontal and vertical angle is obtained by means of a sensor system, wherein a depth map of surroundings is determined from the distance image. According to the invention, a free space delimiting line delimiting an unobstructed region of the surroundings is identified, the depth map being segmented outside and along the free space delimiting line by forming segments of a suitable equal width from pixels having an equal or similar distance from a plane, wherein the height of each segment is estimated as part of an object located outside the unobstructed region, so that each segment is characterized by a two-dimensional position of a base point (for example determined by distance and angle with respect to a longitudinal axis of the vehicle) and by the height thereof.

The three-dimensional surroundings described by the distance image and the depth map are approximated by the unobstructed region (also referred to as free space area). The unobstructed region may for example be a passable region which does, however, not have to be planar. The unobstructed region is delimited by the rod-like segments which as a whole model the objects surrounding the unobstructed region. In the simplest case, these segments stand on the ground and approximate an average height of the object in the region of the respective segment. Objects of variable height, such as cyclists viewed from the side, are in this way described by a piece-wise constant height function.

The segments obtained in this way (also referred to as stixels) form a compact and rugged representation of the objects and only require a limited data volume irrespective of the density of the stereo correspondence analysis used for providing the depth map. Location and height are stored for each stixel. This representation is optimally suited to any subsequent steps, such as object formation and scene interpretation. The stixel representation provides an ideal interface between application-independent stereo analysis and application-specific evaluations.

BRIEF DESCRIPTION OF THE DRAWING

An embodiment of the invention is explained in greater detail below with reference to a drawing.

Of the drawing:

FIG. 1 is a two-dimensional representation of surroundings with a free space delimiting line and a number of segments for modelling objects in the surroundings.

DETAIL DESCRIPTION OF THE INVENTION

FIG. 1 is a two-dimensional representation of surroundings 1 with a free space delimiting line 2 and a number of segments 3 for modelling objects 4.1 to 4.6 in the surroundings 1. The segments 3 or stixels model the free driving space delimited by the free space delimiting line 2.

To generate the representation shown in the drawing, a method is used wherein two images each of the respective surroundings are recorded and a disparity image is obtained by means of stereo image processing. For stereo image processing, the method described in [H. Hirschmüller: "Accurate and Efficient Stereo Processing by Semi-Global Matching and Mutual Information", CVPR 2005, San Diego, Calif., Volume 2 (June 2005), pp. 807-814] can be used for example. From the thus obtained disparities, a depth map of the surroundings is generated, for example as described in [H. Badino, U. Franke, R. Mester: Free Space Computation using Stochastic Occupancy Grids and Dynamic Programming" in Dynamic Programming Workshop for ICCV 07, Rio de Janeiro, Brazil].

The free space delimiting line 2 which delimits the unobstructed region of the surroundings 1 is identified. Outside and along the free space delimiting line 2, the depth map is segmented by forming segments 3 of a predetermined width from pixels having an equal or similar distance from an image plane of one or more cameras.

The segmenting may for example be carried out by means of the method described in [H. Badino, U. Franke, R. Mester: Free Space Computation using Stochastic Occupancy Grids and Dynamic Programming" in Dynamic Programming Workshop for ICCV 07, Rio de Janeiro, Brazil].

An approximation of the established free space delimiting line 2 into segments 3 (rods, stixels) of a predetermined width (any presets possible) provides the distance of the segments; if the orientation of the camera with respect to the surroundings (for example a road in front of a vehicle on which the camera is mounted) and the 3D layout are known, a respective base point of the segments 3 in the image is obtained.

A height is then estimated for each segment 3, so that each segment 3 is characterized by a two-dimensional position of a base point and by its height.

In the simplest case, the height can be estimated by means of a histogram-based evaluation of all 3D points in the region of the segment. This step may be carried out using dynamic programming.

Regions which do not contain any segments 3 are regions in which no objects were found by free space analysis.

Several images can be recorded and processed sequentially, wherein movement information can be extracted from changes in the depth map and in the disparity image and assigned to the segments 3. In this way, moving scenes can be represented as well and for example be used to predict an expected movement of the objects 4.1 to 4.6. This type of movement tracing is also referred to as tracking. To determine the movement of the segments 3, a movement of the vehicle itself can be detected and used for compensation. The compactness and ruggedness of the segments 3 results from the integration of a plurality of pixels in the region of the segment 3 and—in the tracking variant—from the additional integration over time.

The assignment of each of the segments 3 to one of the objects 4.1 to 4.6 can also be stored, together with other information on each segment. This is, however, not absolutely necessary.

The movement information may for example be obtained by the integration of the optical flow, so that a real movement can be estimated for each of the segments 3. Suitable methods are for example known from work on 6D vision as published in DE 102005008131 A1. This movement information further simplifies the grouping of objects, as it allows for checks for compatible movements.

The position of the base point, the height and the movement information of the segment 3 can be obtained by means of scene flow. Scene flow is a class of methods aimed at determining, from at least two consecutive pairs of stereo images, the correct movement in space and the 3D position for each image point as far as possible—see [Sundar Vedulay, Simon Bakery, Peter Randeryz, Robert Collinsy and Takeo Kanade: "Three-Dimensional Scene Flow", appeared in the $7^{th}$ International Conference on Computer Vision, Corfu, Greece, September 1999]. On the basis of the identified segments 3, information can be generated for a driver assistance system in a vehicle on which the camera is mounted.

For example, the time remaining before a collision of the vehicle with an object 4.1 to 4.6 represented by segments 3 can be estimated.

In addition, a driving corridor 5 can be placed in the unobstructed region to be used by the vehicle, wherein a lateral distance of at least one of the objects 4.1 to 4.6 from the driving corridor 5 is determined.

Furthermore, critical, in particular moving, objects 4.1 to 4.6 can be identified to support a turnoff assistance system and/or an automatic driving light circuit and/or a pedestrian protection system and/or an emergency braking system.

Information from further sensors can be combined with the information for the support of the driver assistance system which is assigned to the segments 3 (sensor fusion). This in particular applies to active sensors such as LIDAR.

The width of the segments 3 can for example be set to five image points. For an image with VGA resolution, this results in a maximum of 640/5=128 segments, which are unambiguously described by distance and height. The segments 3 have unambiguous proximity relations and can therefore be grouped in a very simple way to objects 4.1 to 4.6. In the simplest case, only distance and height have to be communicated for each segment 3; if the width of the segment 3 is known, an angle (columns in the picture) is obtained from an index.

The distance image can be determined by means of any sensor system over horizontal and vertical angle, and the depth map of the surroundings is determined from the distance image.

Two images of the surroundings 1 can in particular be recorded by a camera each, and a disparity image can be obtained by means of stereo image processing, the distance image and the depth map being determined from the disparities.

In addition, a photo mixing detector and/or a three-dimensional camera and/or a lidar and/or a radar can be used to act as a sensor system.

LIST OF REFERENCE NUMERALS 1 surrounding
2 free space delimiting line
3 segment
4.1 to 4.6 object
5 driving corridor

The invention claimed is:

1. A method for detecting objects, comprising:
   obtaining by means of a sensor system a horizontal and vertical distance image of objects in the surroundings of the sensor system,
   determining a depth map of objects in the surroundings (1) from the distance image, such that a free space delimiting line (2) delimiting an unobstructed region of the surroundings (1) is identified in the distance image, the depth map being segmented outside and along the free space delimiting line (1) by forming segments (3) of equal width from pixels having an equal or similar distance from a plane,
   wherein the height of each segment (3) is estimated as part of an object (4.1 to 4.6) located outside the unobstructed region, so that each segment (3) is characterized by a two-dimensional position of a base point and by its height.

2. The method according to claim 1, wherein two images each of the surroundings (1) are recorded by means of a camera each, and wherein a disparity image is obtained by means of stereo image processing, the distance image and the depth map being determined from the detected disparities.

3. The method according to claim 1, wherein a photo mixing detector and/or a three-dimensional camera and/or a lidar and/or a radar is/are used as a sensor system.

4. The method according to claim 1, wherein several distance images are obtained and processed sequentially, wherein movement information is extracted from changes in the depth map and assigned to the segments (3).

5. The method according to claim 4, wherein the movement information is obtained by the integration of the optical flow.

6. The method according to claim 4, wherein the position of the base point, the height and the movement information of the segment (3) are obtained by means of scene flow.

7. The method according to claim 1, wherein the assignment of the segments (3) to one of the objects (4.1 to 4.6) is determined, and wherein the segments (3) are provided with information on their assignment to one of the objects (4.1 to 4.6).

8. The method according to claim 1, wherein the height of the segment (3) is determined by means of a histogram-based evaluation of all three-dimensional points in the region of the segment (3).

9. The method according to claim 1, wherein, on the basis of the identified segments (3), information is generated for a driver assistance system in a vehicle on which cameras for recording the images are mounted.

10. The method according to claim 9, wherein a time remaining before the collision of the vehicle with an object (4.1 to 4.6) represented by segments (3) is estimated.

11. The method according to claim 9, wherein a driving corridor (5) is placed in the unobstructed region, wherein a lateral distance of at least one of the objects (4.1 to 4.6) from the driving corridor (5) is determined.

12. The method according to claim 9, wherein critical objects (4.1 to 4.6) are identified to support a turnoff assistance system and/or an automatic driving light circuit and/or a pedestrian protection system and/or an emergency braking system, and/or in that a driver is supported when driving on a traffic lane.

13. The method according to claim 9, wherein information from further sensors is combined with the information for supporting the driver assistance system which is assigned to the segments (3).

* * * * *